US008077660B2

(12) United States Patent
Ishida

(10) Patent No.: US 8,077,660 B2
(45) Date of Patent: Dec. 13, 2011

(54) BASE STATION APPARATUS, ACCESS GATEWAY APPARATUS, COMMUNICATION CONTROL SYSTEM AND COMMUNICATION CONTROL METHOD

(75) Inventor: Hiroshi Ishida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 12/376,954

(22) PCT Filed: Sep. 13, 2006

(86) PCT No.: PCT/JP2006/318157
§ 371 (c)(1),
(2), (4) Date: Feb. 9, 2009

(87) PCT Pub. No.: WO2008/032372
PCT Pub. Date: Mar. 20, 2008

(65) Prior Publication Data
US 2010/0165917 A1 Jul. 1, 2010

(51) Int. Cl.
*H04W 4/00* (2009.01)
(52) U.S. Cl. ..... 370/328; 370/352; 370/389; 455/435.1; 455/433
(58) Field of Classification Search ............... 370/310, 370/328; 455/435.1, 90.3, 466, 500
See application file for complete search history.

(56) References Cited

U.S. PATENT DOCUMENTS

| 6,393,288 | B1 * | 5/2002 | Sollee et al. ............... 455/445 |
| 2002/0086685 | A1 * | 7/2002 | Wallentin et al. ............ 455/458 |
| 2006/0025161 | A1 | 2/2006 | Funato et al. | |

FOREIGN PATENT DOCUMENTS

| JP | 2003-143643 | 5/2003 |
| JP | 2005-86560 | 3/2005 |

OTHER PUBLICATIONS

International Search Report dated Nov. 21, 2006.
J. Kempf, "Requirements and Functional Architecture for an IP Host Alerting Protocol," Network Working Group, Request for Comments: 3154 Category: Informational, Aug. 2001, pp. 1-16, p. 12, line 5.
C. Perkins, Ed., "IP Mobility Support for IPv4," Network Working Group, Request for Comments: 3344, Nokia Research Center, Obsoletes: 3220, Category: Standards Track, Aug. 2002, pp. 1-99. p. 12, line 7.
D. Johnson, "Mobility Support in IPv6," Network Working Group, Request for Comments: 3775, Rice University, Category: Standards Track, Nokia Research Center, Jun. 2004, pp. 1-165, p. 12, line 9.

(Continued)

*Primary Examiner* — Huy Vu
*Assistant Examiner* — Maria Sekul
(74) *Attorney, Agent, or Firm* — Dickinson Wright PLLC

(57) ABSTRACT

A communication control system capable of reducing the traffic amount, CPU's processing load and channel bands related to a location registering process. In this system, a transmitting/receiving part (301) of a base station apparatus (300) receives a call request message transmitted from an access gateway apparatus (200) and addressed to a wireless terminal apparatus, and a location registration determining part (306) determines whether a wireless link to the wireless terminal apparatus to be called can be established. If the wireless link has been established, a position registering part (307) registers an IP address established at the transmitting source of the call request message, and the transmitting/receiving part (301) transmits, to the access gateway apparatus (200), a call response message indicative of accommodating the wireless terminal apparatus in response to the call request message.

4 Claims, 9 Drawing Sheets

OTHER PUBLICATIONS

3GPP Joint RAN WG2 WG3 Meeting, R2-052900, Nov. 7-11, 2005, Seoul, Korea, Agenda Item: 5, Source: Ericsson, Title: "Solutions for a 2-node 3GPP SAE / LTE architecture," Document for: Discussion, Decision, 6 pages total, p. 12, line 3.

T. Fuji, et al., "Ubiquitous Network ni Okeru IP Mobility no Kukan Seigyo Gijutsu" ("Spatial Control Technologies of IP Mobility for Ubiquitous Networks"), The Journal of the Institute of Electronics Information and Communication Engineers, vol. 87, No. 5, May 1, 2004, pp. 390-395.

* cited by examiner

BASE STATION APPARATUS, ACCESS GATEWAY APPARATUS, COMMUNICATION CONTROL SYSTEM AND COMMUNICATION CONTROL METHOD

TECHNICAL FIELD

The present invention relates to a base station apparatus, access gateway apparatus, communication control system and communication control method in a next-generation 3GPP system.

BACKGROUND ART

The 3rd generation partnership project ("3GPP") is currently studying a next-generation 3GPP system to be connected to existing 3GPP systems, the Internet, wireless local area networks ("WLANs") and so on. FIG. 1 shows a network architecture of a next-generation 3GPP system (i.e. evolved 3GPP system) (Non-Patent Document 1).

Next-generation 3GPP system 10 shown in FIG. 1 is comprised of other 3GPP systems (including existing 3GPP systems), non-3GPP systems (including WLAN systems) and a plurality of access gateways (hereinafter "ACGWs") 20-1 to 20-n connected to the Internet and a plurality of enhanced Node Bs (hereinafter "eNode Bs") 30-1 to 30-n accommodated in these access gateways.

Although it is currently under study by the 3GPP, basically, eNode B 30 directly accommodates radio terminal apparatuses (i.e. user equipment, or hereinafter "UEs") and provides radio access functions between eNode B 30 and UEs. ACGW 20 accommodates a plurality of eNode Bs 30-1 to 30-n and transmits/receives packets between eNode Bs 30-1 to 30-n and other ACGWs. Furthermore, ACGW 20 provides mobility functions and so on for when UEs move between the eNode Bs accommodated in ACGW 20. For example, when a UE moves from eNode B 30-1 to eNode B 30-2 accommodated in ACGW 20, ACGW 20 switches the path from source eNode B 30-1 of the UE to destination eNode B 30-2. ACGW 20 then transmits a data packet received from another ACGW to eNode B 30-2 to which the path is set, and transmits a data packet transmitted from this eNode B 30-2 to another ACGW connected to the eNode B that accommodates the UE of the destination of the data packet. Although there are cases where a path is tentatively set directly from eNode B 30-1 to eNode B 30-2 and data directed to a UE is directly transferred from eNode B 30-1 to eNode B 30-2, eventually, ACGW 20 switches the path.

Next, the mobility control scheme for a radio terminal apparatus that moves between eNode Bs, which is the technique the above-described next-generation 3GPP system is based upon, will be explained. FIG. 2 schematically shows the mobility control for when a radio terminal apparatus moves between eNode Bs. For ease of explanation, a case will be explained here using two eNode Bs.

When UE 40 accommodated in eNode B 30-1 moves to the area covered by eNode B 30-2, UE 40 transmits a transfer request to ACGW 20 via eNode B 30-2. To be more specific, UE 40 transmits a transfer request for switching the path to ACGW 20 via eNode B 30-2, in order to establish a radio link and carry out radio communication with eNode B 30-2 having stronger radio intensity than eNode B 30-1, based on the radio intensity received from eNode B 30. ACGW 20 receives the transfer request from eNode B 30-2 and switches the path, so that data directed to UE 40, which has been transmitted using path 1 by then, will be transmitted using path 2. ACGW 20 then transmits a transfer reply to UE 40. In this way, the system performs such transfer control on a UE that moves between eNode Bs.

Next, the mobility control technique shown in FIG. 2 will be explained in detail using FIG. 3. FIG. 3 illustrates the mobility control scheme in detail.

This next-generation 3GPP system 10 provides eNode B 30 with a proxy mobile agent ("proxy MA") and ACGW 20 with a local home agent ("local HA"), using a proxy MIP, and carries out various mobile IP (mobile Internet protocol or hereinafter "MIP")-related processings. Here, the mobile IP refers to a protocol for automatically detecting a transfer of a radio terminal apparatus between networks and for enabling the radio terminal apparatus to carry out communication in the network after the transfer in the same way as in the network before the transfer.

As shown in FIG. 3, since UE 40 is accommodated in eNode B 30-1, first, IP tunnel 1 is constructed between eNode B 30-1 and ACGW 20, and ACGW 20 and eNode B 30-1 transmit/receive data directed to UE 40 using this IP tunnel 1.

Here, when UE 40 attempts to move to eNode B 30-2, UE 40 transmits radio intensity information (i.e. measurement report) to eNode B 30-1 and reports a transfer request (step S1). This radio intensity information includes radio intensity information of UE 40 and eNode B 30-1 and radio intensity information of UE 40 and eNode B 30-2. Upon receiving radio intensity information from UE 40, eNode B 30-1 exchanges information such as resource reservation with destination eNode B 30-2, and checks whether or not eNode B 30-2 can accept UE 40 (step 92). Although this information exchange is normally carried out via ACGW 20, when, for example, eNode Bs are connected via a physical channel, direct exchange of information may be possible. When eNode B 30-2 can accept UE 40, eNode B30-1 transmits a handover request message (i.e. handover request) to UE 40 (step 93). Upon receiving the handover request message, that is, upon receiving a transfer request to eNode B 30-2, UE 40 establishes a radio link with destination eNode B 30-2 (i.e. radio bearer setup) (step S4), and transmits a transfer completion message (i.e. HO complete) to eNode B 30-2 after having established a radio link (step 95).

eNode B 30-2 then transmits a position registration request message (i.e. MIP registration request) to ACGW 20 (step S6), and, ACGW 20 having received this position registration request message makes changes to a routing table that ACGW 20 holds inside. That is, when the destination IP address of an IP packet matches the IP address of UE 40 in the routing table, ACGW 20 changes the care of address ("CoA") from eNode B 30-1 to eNode B 30-2, carries out IP encapsulation of the data packet, and transmits the data packet to UE 40.

ACGW 20 then transmits a position registration revocation message (i.e. MIP registration revocation) to eNode B 30-1 (step S7), and releases the resources of source eNode B 30-1. eNode B 30-1 then transmits a position registration revocation reply message (i.e. MIP registration revocation acknowledgement) to ACGW 20 (step S8). Furthermore, ACGW 20 transmits a position registration reply message (i.e. MIP registration reply) to eNode B 30-2 (step S9). Through the above-described processing, the packet directed to UE 40 after the transfer transmitted from another ACGW is transferred to eNode B 30-2 by ACGW 20.

Next, FIG. 4 shows a scheme adopting the control premised upon the above-described mobility technique disclosed in IETF RFC 3154, as a conventional paging control technique (Non-Patent Document 2).

First, UE 40 is in an idle state, and the network side knows the tracking area of UE 40. Here, a tracking area refers to the area where an ACGW accommodates an eNode B. ACGW 20 holds information about radio terminal apparatuses accommodated in the eNode B in this tracking area. Here, for example, as shown in FIG. 4, ACGW 20 knows that UE 40 is somewhere among eNode B 30-1, eNode B 30-2, . . . eNode B 30-n.

An entity (not shown) such as an ACGW having received an IP packet of data directed to UE 40, transmits a paging request message (i.e. paging request) to ACGW 20 that accommodates the tracking area of UE 40 of the destination of the packet (step S11). Here, the entity where the IP packet is terminated once may be another apparatus connected to ACGW 20 over the Internet and so on. That is, ACGW 20 having received the data packet looks up the database of the core network (e.g., network constructed between communication systems), finds out the apparatus (here, ACGW 20) that accommodates the eNode B which accommodates destination UE 40 from the IP address of the received data packet, and transmits a paging request message reporting that the data directed to UE 40 has been received, to the apparatus.

ACGW 20 having received the paging request message performs its own paging processing, and transmits paging request messages to all eNode Bs 30 in the tracking area of UE 40 (step S12). The eNode B that actually accommodates UE 40 (here, eNode B 30-2) establishes a radio link with UE 40 (step S13), and then transmits a paging reply message (i.e. paging reply) to ACGW 20 (step S14). ACGW 20 receives the paging reply message and transmits the paging reply message to the terminating entity of the IP packet, that is, to the apparatus of the sender of the IP packet (step S15).

eNode B 30-2 performs its own position registration processing, that is, registers the IP address set in ACGW 20 of the source of the paging request, and transmits a position registration request message (i.e. MIP registration request) to ACGW 20, to establish an IP tunnel with ACGW 20 (step S16). ACGW 20 having received the position registration request message, makes changes to the routing table. Here, the CoA of the IP packet, in which the destination IP address is the IP address of UE 40, is changed such that the IP packet is transmitted to the IP tunnel of the IP address of eNode B 30-2. ACGW 20 then transmits a position registration reply message (i.e. MIP registration reply) to eNode B 30-2 (step S17).

Paging processing and position registration processing are completed through the above-described processing, and an incoming IP packet directed to UE 40 is delivered to UE 40 (steps S18 to S20).

FIG. 5 shows a functional configuration of ACGW 20 and eNode B 30 that perform the above-described paging control. First, the functional configuration of ACGW 20 will be explained. ACGW 20 is comprised of IP layer processing section 21, paging processing section 22, proxy MIP home agent ("MIP HA") processing section 23 and database 24.

IP layer processing section 21 of ACGW 20 decapsulates the packet using the IP address set in ACGW 20, and receives the packet. Particularly, IP layer processing section 21 receives a paging request message from another ACGW to a radio terminal apparatus in eNode B 30 accommodated in ACGW 20, and a paging reply message from eNode B 30, and outputs these messages to paging processing section 22. Furthermore, IP layer processing section 21 receives a position registration request message from eNode B 30, and outputs the message to MIP HA processing section 23.

Furthermore, IP layer processing section 21 encapsulates the packet using the IP address set in ACGW 20, and transmits the packet. Particularly, IP layer processing section 21 transmits a paging request message (i.e. PR) inputted from paging processing section 22 and a position registration reply message (i.e. MRRly) inputted from MIP HA processing section 23, to eNode B 30.

Based on the paging request message from another ACGW inputted from IP layer processing section 21, paging processing section 22 performs paging processing, that is, paging processing section 22 tentatively stores, in page units, information whereby the paging of the destination radio terminal apparatus can be checked, from inside the paging request message. Paging processing section 22 then outputs this paging request message to IP layer processing section 21 to transfer to the eNode B that accommodates the destination radio terminal apparatus of the paging request.

MIP HA processing section 23 receives a position registration request message inputted from IP layer processing section 21, and performs position registration processing of ACGW 20. That is, in order to establish a path with the position registration request source, when the IP address of the radio terminal apparatus included in the position registration request message matches the IP address of the destination radio terminal apparatus of the paging request, MIP HA processing section 23 makes the IP address of the destination radio terminal apparatus the home address and the IP address set in eNode B 30 of the position registration request source the CoA, and outputs these addresses to database 24. MIP HA processing section 23 then generates a position registration reply message to transmit to eNode B 30, and outputs the position registration reply message to IP layer processing section 21.

Database 24 is a mobile IP ("MIP")-related database (i.e. MIP database), and, especially when position registration processing is carried out in MIP HA processing section 23, database 24 stores information such as the IP addresses received as input.

Next, the functional configuration of eNode B 30 will be explained. eNode B 30 is comprised of IP layer processing section 31, paging processing section 32, proxy MIP mobile agent ("MIP MA") processing section 33 and database 34.

IP layer processing section 31 of eNode B 30 decapsulates a packet using the IP address set in eNode B 30, and receives the packet. Particularly, IP layer processing section 31 receives a paging request message from paging processing section 22 of ACGW 20, and outputs the paging request message to paging processing section 32.

Furthermore, IP layer processing section 31 encapsulates a packet using the IP address set in eNode B 30, and transmits the packet. Particularly, IP layer processing section 31 receives a paging reply message (i.e. PRly) inputted from paging processing section 32 and a position registration request message (i.e. MRReq) inputted from MIP HA processing section 33, and transmits these messages to ACGW 20.

Paging processing section 32 receives a paging request message inputted from IP layer processing section and performs paging processing, that is, paging processing section 32 tentatively stores, in page units, information whereby the paging of the destination radio terminal apparatus can be checked, from inside the paging request message. Paging processing section 32 then generates a paging reply message in response to this paging request, outputs the paging reply message to IP layer processing section 31 and triggers MIP MA processing section 33.

In order to perform the position registration processing of eNode B 30 according to the trigger from paging processing section 32, that is, in order to establish a path with the position registration request destination, MIP MA processing section 33 registers the IP address of the destination radio terminal apparatus included in the paging request message and the IP address set in ACGW 20 as the CoA for paging request source, with MIP-related database 34. MIP HA processing section 33 then outputs a position registration request message (i.e. MIP registration request) for requesting the registration of the IP address set in eNode 30, to IP layer processing section 31.

Database 34 is a mobile IP ("MIP")-related database (i.e. MIP database) and stores, especially when position registration processing is carried out in MIP HA processing section 33, information such as the IP addresses received as input.

Non-Patent Document 1: 3GPP RAN #49 Contribution R2-052900
Non-Patent Document 2: IETF RFC 3154 "Requirements and Functional Architecture for an IP Host Alerting Protocol"
Non-Patent Document 3: IETF RFC 3344 "IP mobility Support for IPv4"
Non-Patent Document 4: IETF RFC 3775 "Mobility Support in IPv6"

DISCLOSURE OF INVENTION

Problems to be Solved by the Invention

Generally, reducing the load of position registration processing, that is, reducing position registration traffic, is an important issue.

However, according to the prior art, eNode B 30-2 transmits a paging reply message (i.e. paging reply) and then transmits a position registration request message (i.e. MIP registration request) to ACGW 20. That is, although these paging reply message and position registration request message include overlapping information, these messages are transmitted to the same destination, separately, at virtually the same transmission timing, and this increases the load of traffic processing. Furthermore, since overlapping information is transmitted in different packets, useless load is imposed on the CPU of the apparatus constituting the system. Furthermore, transmitting a paging reply message and a position registration request message separately results in an increase of the band used for the channel.

Moreover, although user data is transmitted immediately after completion of paging processing, ACGW 20 returns a position registration reply message (i.e. MIP registration reply) apart from a paging reply, and this results in increased load of position registration processing.

It is therefore an object of the present invention to provide a communication control system, access gateway apparatus, base station apparatus and communication control method that reduce the amount of traffic involved in position registration processing, processing load on the CPU and the band used for the channel.

Means for Solving the Problem

The base station apparatus of the present invention adopts a configuration including: a receiving section that receives a paging request message to a radio terminal apparatus, transmitted from an access gateway apparatus; a position registration judgment section that judges whether or not it is possible to establish a radio link with the radio terminal apparatus of a paging target addressed by the paging request message; a position registration section that registers, when the radio link is established, an internet protocol address indicating the access gateway apparatus of the paging request message; a paging reply section that generates a paging reply message indicating that the radio terminal apparatus is accommodated, in response to the paging request message; and a transmitting section that transmits the paging reply message to the access gateway apparatus.

Furthermore, the access gateway apparatus of the present invention adopts a configuration including: a receiving section that receives a paging reply message transmitted from the base station apparatus of claim 1 indicating that the base station apparatus accommodates the radio terminal apparatus; and a mobile internet protocol registration section that registers an internet protocol address indicating the base station apparatus of the paging reply message based on the paging reply message.

Advantageous Effect of the Invention

The present invention decides whether or not it is possible to establish a radio link with a radio terminal apparatus of the destination of a paging request and performs position registration processing, so that it is possible to reduce the amount of traffic involved in position registration processing, the CPU load of the apparatus and the band used for the channel.

BEST MODE FOR CARRYING OUT THE INVENTION

Hereinafter, an embodiment of the present invention will be explained in detail with reference to the accompanying drawings.

Figure 1:
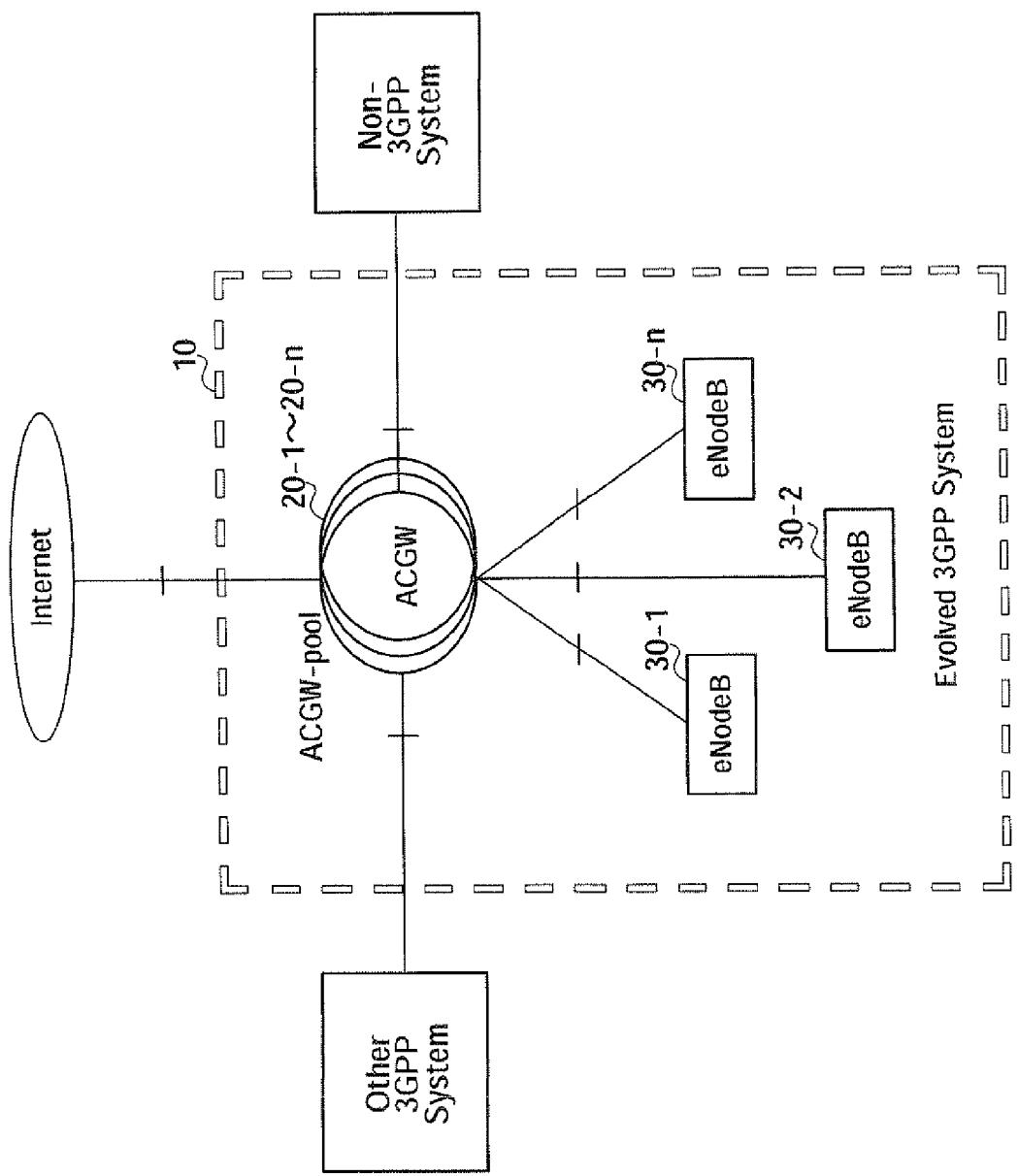
FIG. 1 shows a network architecture of a next-generation 3GPP system.
Figure 2:
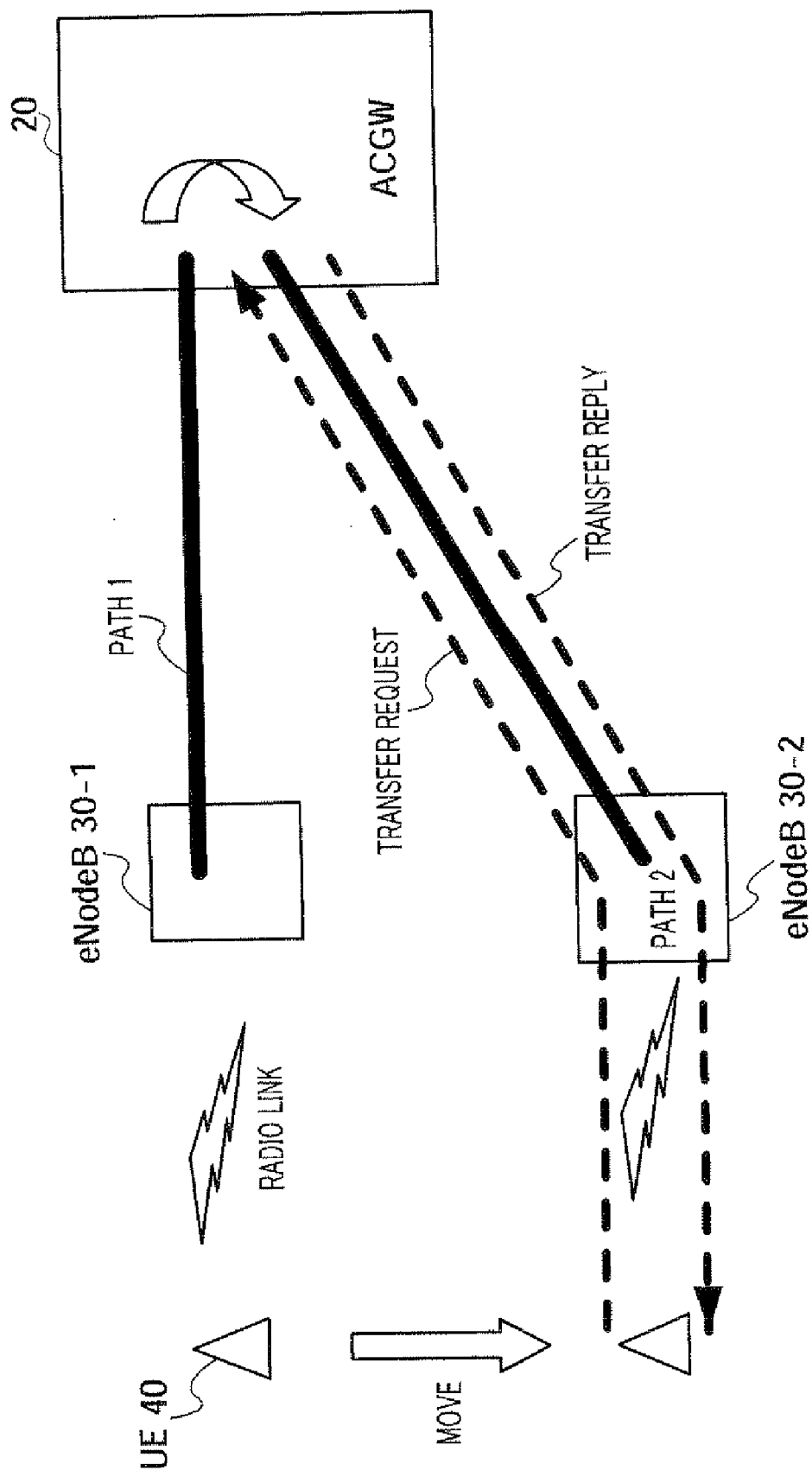
FIG. 2 is a schematic diagram to illustrate mobility control.
Figure 3:
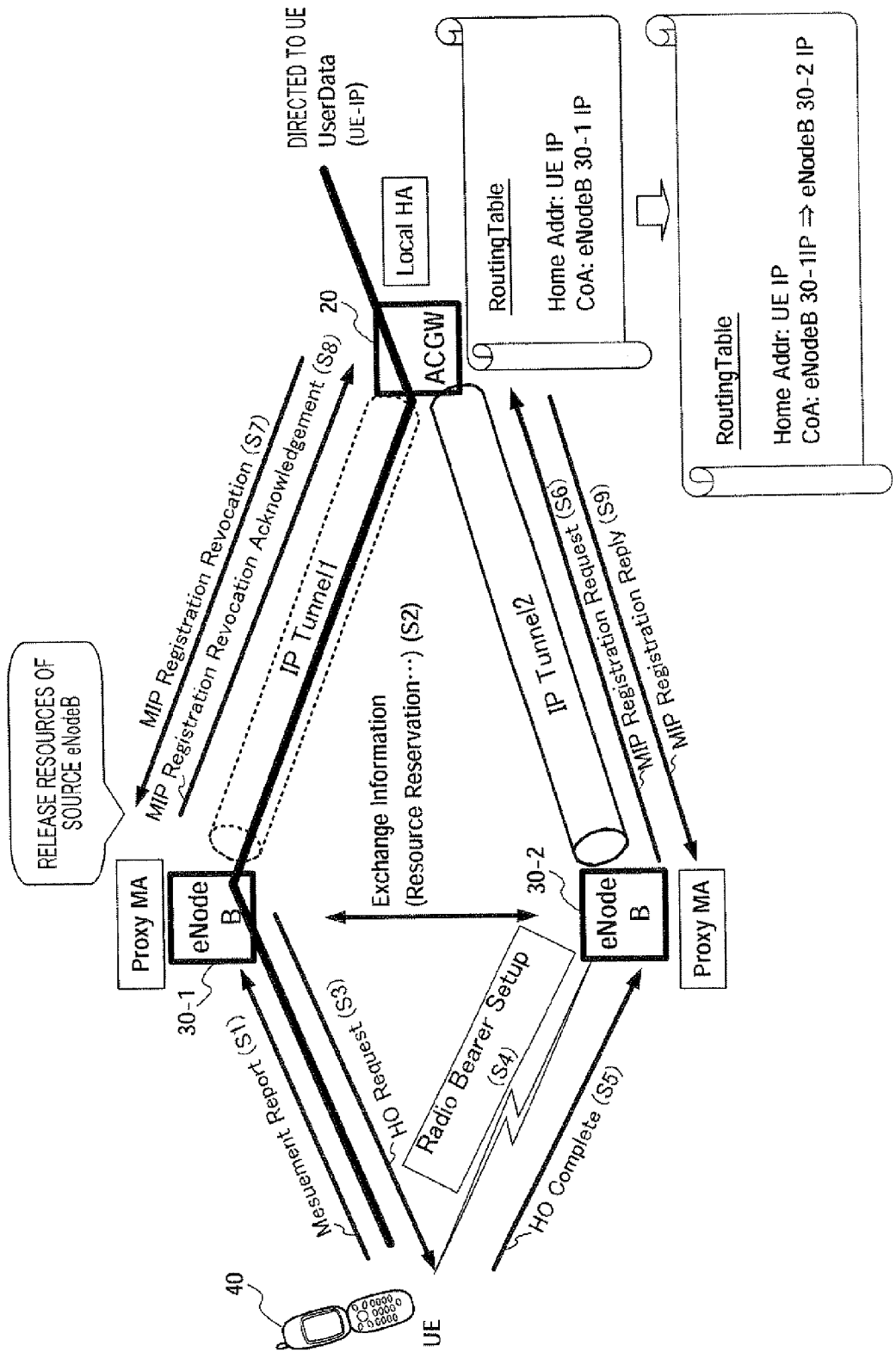
FIG. 3 illustrates the mobility control explained in FIG. 2 in further detail.
Figure 4:
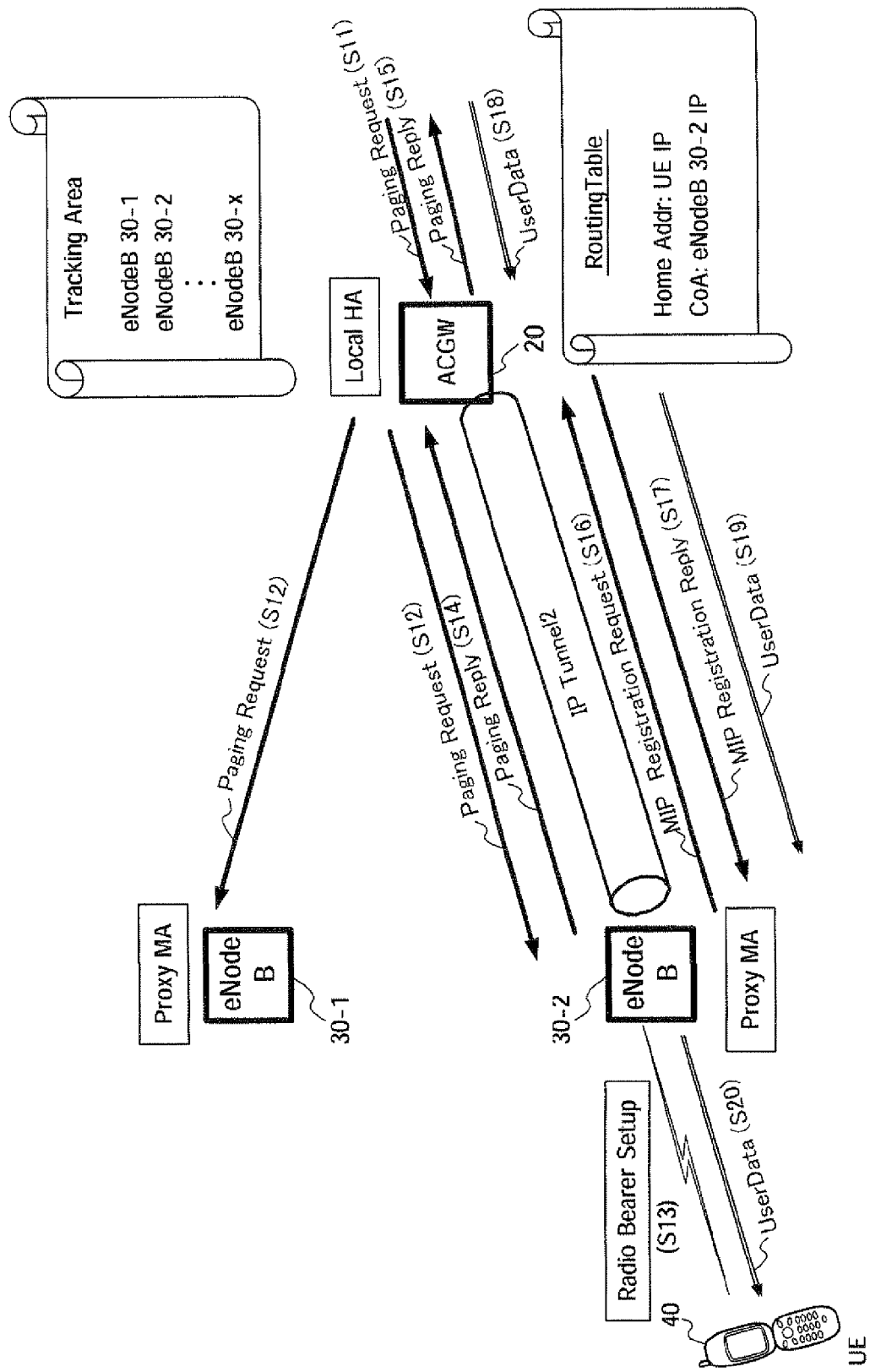
FIG. 4 illustrates a conventional paging control scheme in mobility control.
Figure 5:
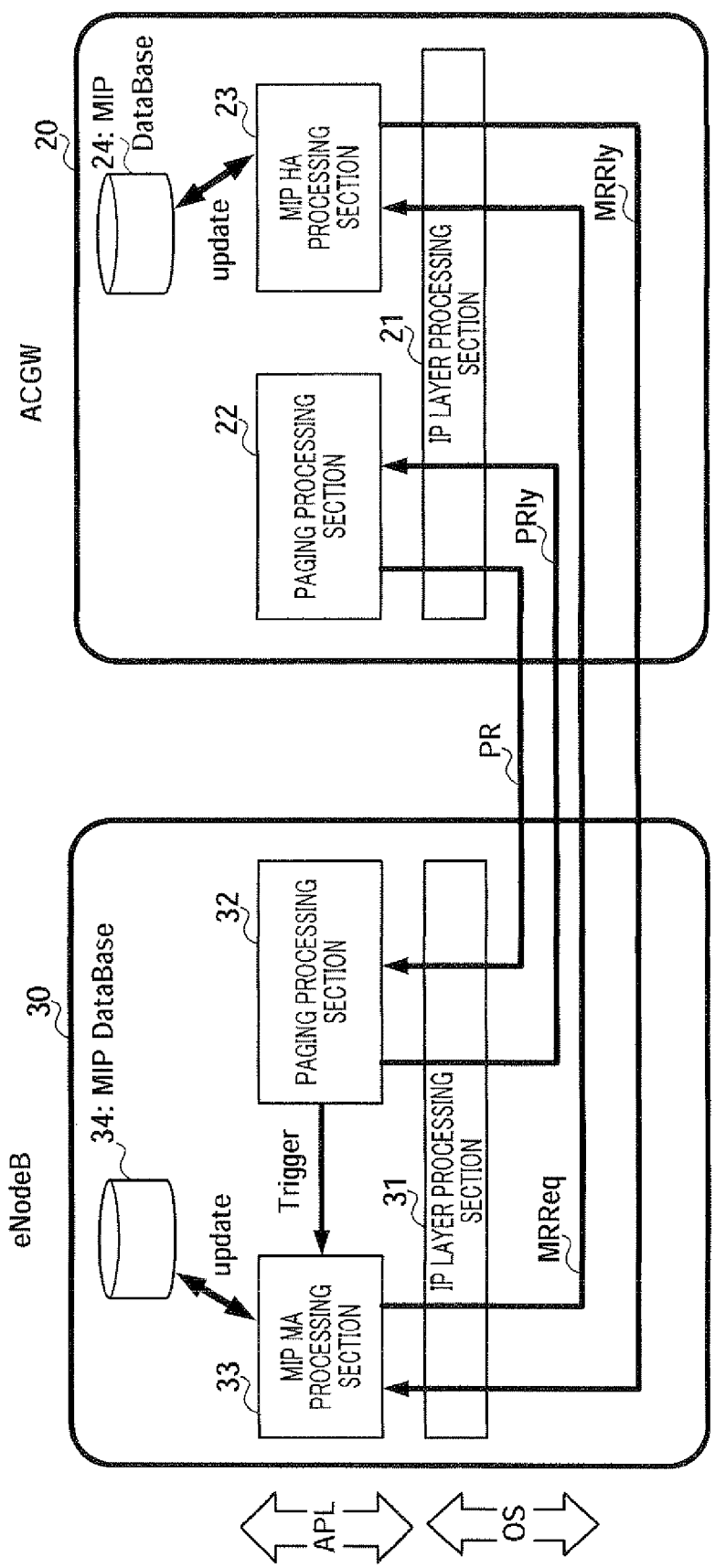
FIG. 5 shows configurations of conventional eNode B and ACGW.
Figure 6:
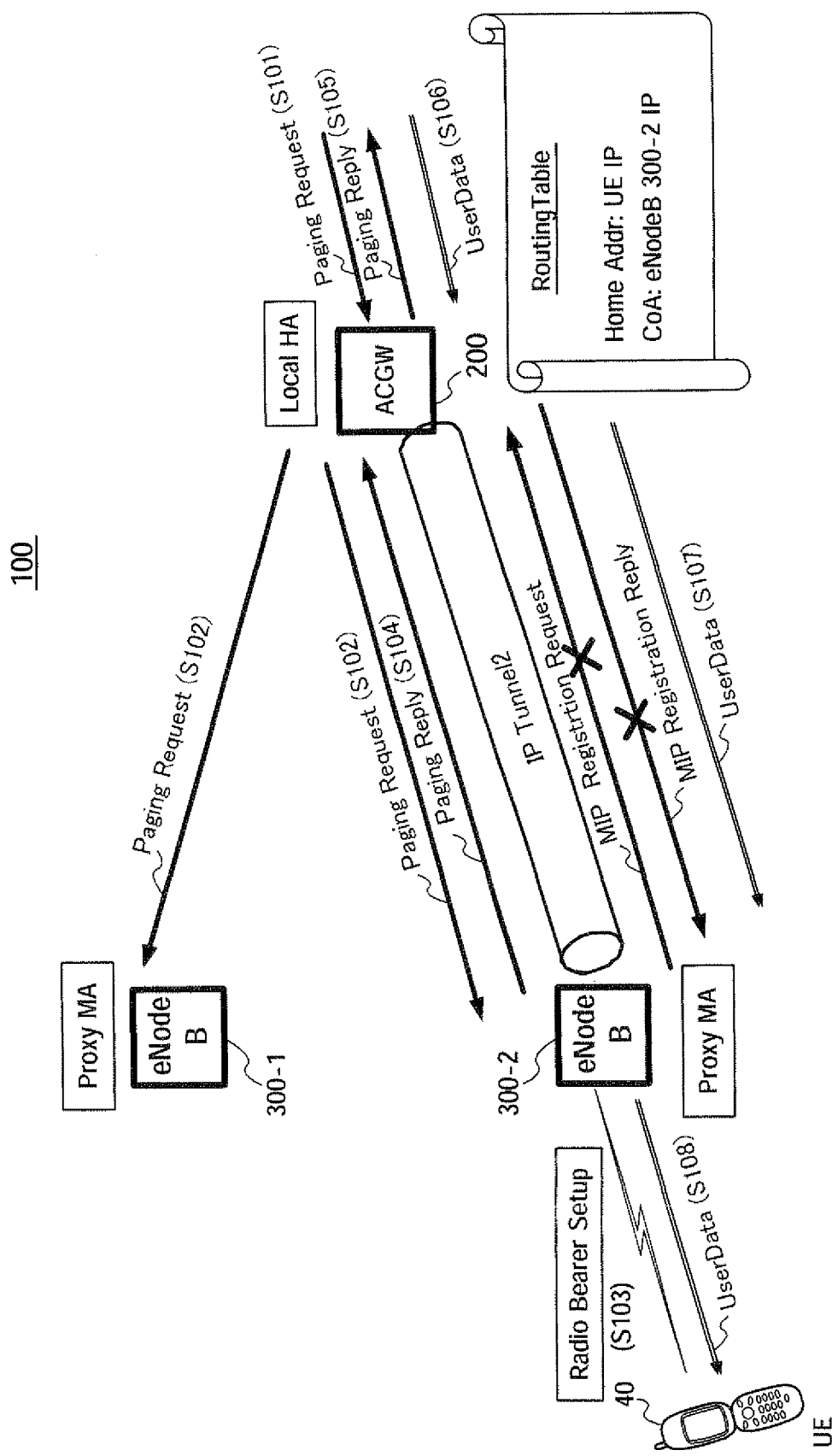
FIG. 6 schematically illustrates a paging control scheme in a communication control system according to an embodiment of the present invention.

FIG. 6 schematically shows the paging control scheme in communication control system 100 according to an embodiment of the present invention. Communication control system 100 shown in FIG. 6 is comprised of access gateway ("AGCW") apparatus 200, a plurality of eNode Bs 300-1 to 300-n accommodated in this access gateway apparatus 200, and radio terminal apparatus ("UE") 400 accommodated in this eNode B. For ease of explanation, the present embodiment will explain a case where two eNode Bs are used.

UE 400 shown in FIG. 6 is in an idle state, and the network side knows the tracking area of UE 400. Here, a "tracking area" (or referred to as "location area") refers to the area where an access gateway apparatus accommodates an eNode B. The access gateway apparatus is able to know information about radio terminal apparatuses accommodated in the eNode B in the tracking area. For example, in the case shown in FIG. 6, access gateway apparatus 200 knows that UE 400 is somewhere in eNode Bs 300-1 and 300-2.

The entity where an IP packet of data directed to UE 400 is terminated once, such as an access gateway apparatus, transmits a paging request message (i.e. paging request) to access gateway apparatus 200 that accommodates the tracking area of UE 400 of the destination of the packet (step S101). Here, the entity may be a different apparatus connected via the Internet and so on, but the present embodiment will explain an access gateway apparatus connected to access gateway apparatus 200, as the entity. That is, another access gateway apparatus having received a data packet looks up the database of the core network (e.g., network constructed between communication systems), finds out the apparatus (here, access gateway apparatus 200) that accommodates the eNode B that accommodates destination UE 400 from the destination IP address of the received data packet, and transmits a paging request message for reporting access gateway apparatus 200 that the data directed to UE 400 has been received.

Access gateway apparatus 200 having received the paging request message performs the paging processing necessary for access gateway apparatus 200 itself, that is, access gateway apparatus 200 tentatively stores, in page units, information whereby the paging of the destination radio terminal apparatus can be checked, from inside the paging request message, and transmits an paging request message to all eNode Bs 300 in the tracking area in UE 400 (step S102).

The eNode B that actually accommodates UE 400 (here eNode B 300-2) decides whether or not it is possible to establish a radio link with UE 400 of the paging target addressed by the paging request message. When a radio link is established (step S103), eNode B 300-2 performs paging processing, generates a paging reply message (i.e. paging reply) that indicates that eNode B 300-2 accommodates UE 400, transmits the paging reply message to access gateway apparatus 200, and also performs the position registration processing of eNode B 300-2 (step S104). That is, when a radio link is established with the radio terminal apparatus of the paging target of the paging request, eNode B 300-2 decides that the timing has arrived position registration processing is possible based on the paging request message, and registers the IP address set in the sender of the paging request message with an MIP-related database in the eNode B.

Access gateway apparatus 200 then receives the paging reply message from eNode B 300-2 and performs paging processing and position registration processing. That is, access gateway apparatus 200 checks the IP address of the radio terminal apparatus in the paging reply message and registers the IP address set in the sender of the paging reply message (i.e. eNode B 300-2), with the NIP-related database held in access gateway apparatus 200. By this means, changes are made to the routing table in the access gateway apparatus such that the IP packet directed to UE 400 is transferred to eNode B 300-2. Here, the routing table is changed such that the home address becomes the IP address of destination UE 400 and the CoA becomes the IP address of eNode B 300-2 that accommodates UE 400.

Access gateway apparatus 200 then transmits a paging reply message (i.e. paging reply) to the IP packet terminating entity (that is, the access gateway apparatus of the sender of the paging request message) (step S105). When the IP packet (i.e. user data) directed to UE 400 arrives at access gateway apparatus 200 (step S106), access gateway apparatus 200 transfers this IP packet to eNode B 300-2 (step S107).

eNode B 300-2 then receives the IP packet directed to UE 400, thereupon checking that the position registration processing by access gateway apparatus 200 has been completed and an IP tunnel has been established, and performs position registration completion processing.

The processing so far completes the paging processing and position registration processing, so that the incoming IP packet directed to UE 400 is delivered to UE 400 (step S108).

That is, eNode B (base station apparatus) 300 decides whether or not eNode B 300 itself can accommodate the radio terminal apparatus of the destination of the paging request and establish a radio link, based on the paging request message. When a radio link is established, eNode B 300 registers the position of the IP address set in the sender of the paging request message, generates a paging reply message indicating that the radio terminal apparatus is accommodated, in response to the paging request, and transmits the paging reply message to the source of the paging request. Access gateway apparatus 200 registers the IP address set in the sender of this paging reply message, based on the received paging reply message. That is, access gateway apparatus 200 interprets the paging reply message from eNode B 300 to be a position registration request (i.e. MIP registration request) from conventional eNode B 300 and performs position registration processing, and eNode B 300 interprets the actual user data transmitted from access gateway apparatus 200 to be a position registration reply (i.e. MIP registration reply) from conventional access gateway apparatus 200 and decides that an IP tunnel has been established. Therefore, it is not necessary to issue a registration request and position registration reply in addition to a paging request and paging reply as in the case of the prior art (shown with "x" symbols in FIG. 6), so that it is possible to reduce the traffic processing load involved in position registration processing and shorten the time required for position registration processing.

Next, the configurations of access gateway apparatus 200 and eNode B 300 constituting the above-described network will be explained. First, the configuration of access gateway apparatus 200 will be explained.

Figure 7:
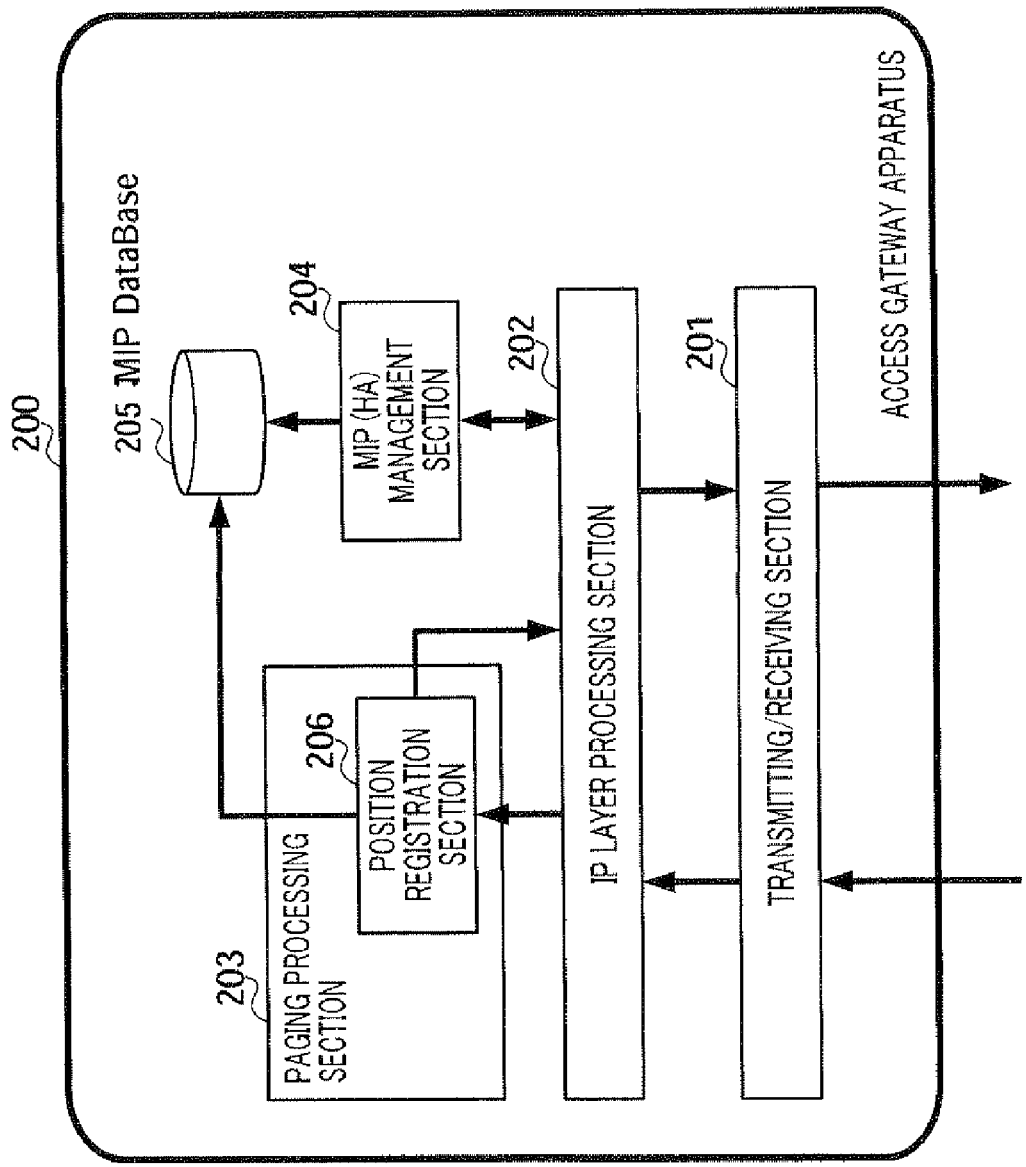
FIG. 7 is a functional block diagram showing a configuration of an access gateway apparatus according to the embodiment of the present invention.

FIG. 7 is a functional block diagram showing a configuration example of access gateway apparatus 200. Access gateway apparatus 200 shown in. FIG. 7 is mainly comprised of transmitting/receiving section 201, IP layer processing section 202, paging processing section 203 and mobile IP home agent ("MIP HA") management section 204 and database 205. Paging processing section 203 has Position registration section 206.

Transmitting/receiving section 201 receives an IP packet transmitted from another access gateway apparatus and so on, and outputs the IP packet to IP layer processing section 202. Furthermore, transmitting/receiving section 201 transmits an IP packet inputted from IP layer processing section 202 to a base station apparatus and so on accommodated in access gateway apparatus 200.

IP layer processing section 202 decapsulates the IP packet inputted from transmitting/receiving section 201, using the IP address set in access gateway apparatus 200, and outputs the decapsulated packet to paging processing section 203 and mobile IP management section 204. Particularly, upon receiving a packet including a paging request message from another ACGW to a radio terminal apparatus in base station apparatus 300 accommodated in access gateway apparatus 200, IP layer processing section 202 outputs this paging request message to paging processing section 203.

Furthermore, IP layer processing section 202 encapsulates a packet using the IP address set in access gateway apparatus 200, and outputs the encapsulated packet to transmitting/receiving section 201. Particularly, IP layer processing section 202 outputs a paging request message and paging reply message inputted from paging processing section 203, to transmitting/receiving section 201.

Paging processing section 203 carries out its own paging processing based on a paging request message from another access gateway apparatus and so on inputted from IP layer processing section 202. That is, paging processing section 203 tentatively stores, in page units, information whereby the paging of the destination radio terminal apparatus can be checked, from inside the paging request message, and outputs a paging request message to transmit to the base station apparatus accommodating the radio terminal apparatus of the destination to IP layer processing section 202.

Furthermore, when a paging reply message from base station apparatus 300 is inputted by IP layer processing section 202 indicating that the destination radio terminal apparatus of the paging request is accommodated, paging processing section 203 carries out position registration processing to establish an IP tunnel. To be more specific, position registration section 206 of paging processing section 203 receives a paging reply message inputted from IP layer processing section 202 and checks whether or not the IP address of the radio terminal apparatus included in this paging reply message matches the IP address of the destination radio terminal apparatus included in the paging request message tentatively stored during the paging processing. When the IP addresses match, position registration section 206 registers the IP address of the sender of the paging reply message as the CoA, that is, registers the IP address set in base station apparatus 200 that accommodates the radio terminal apparatus having the matching IP address, with database 205.

By this means, changes are made to the routing table such that the IP packet directed to UE 400 is transferred to base station apparatus 300 and a path, that is, an IP tunnel, is established between access gateway apparatus 200 and base station apparatus 300.

Furthermore, paging processing section 203 performs paging processing based on the paging reply message, and outputs a paging reply message to transmit to an entity where the IP packet directed to UE 400 is terminated once, that is, another access gateway apparatus connected to access gateway apparatus 200, to IP layer processing section 202.

MIP management section 204 has a proxy MIP home agent ("MIP HA") function and carries out MIP-related processing. For example, when the radio terminal apparatus moves after the position registration through paging processing, MIP management section 204 performs position registration.

Database 205 is a mobile IP ("MIP")-related database (i.e. MIP database) and stores information of the IP addresses received as input and so on, especially when position registration processing is performed in position registration section 206.

Figure 8:
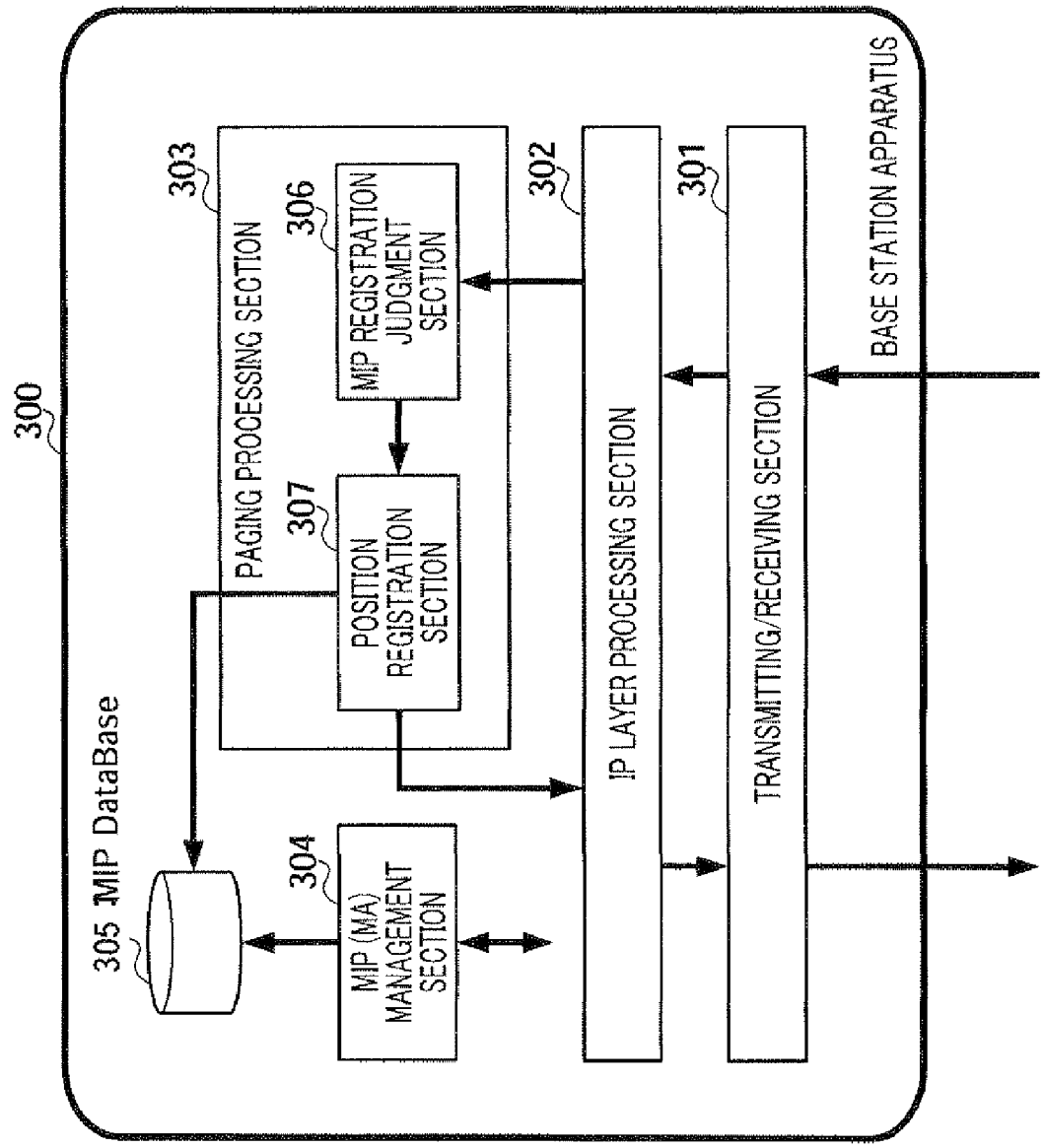
FIG. 8 is a functional block diagram showing a configuration of a base station apparatus according to the embodiment of the present invention.

Next, the configuration of eNode B will be explained. FIG. 8 is a functional block diagram showing a configuration example of eNode B 300. The present embodiment will explain a base station apparatus as an example of eNode B 300.

Base station apparatus 300 shown in FIG. 8 is mainly comprised of transmitting/receiving section 301, IP layer processing section 302, paging processing section 303, mobile IP ("MIP MA") management section 304 and database 305. Furthermore, paging processing section 303 includes position registration judgment section 306 and position registration section 307.

Transmitting/receiving section 301 receives an IP packet transmitted from access gateway apparatus 200, and outputs the IP packet to IP layer processing section 302. Furthermore, transmitting/receiving section 301 transmits the IP packet inputted from IP layer processing section 302 to access gateway apparatus 200.

IP layer processing section 302 decapsulates the IP packet inputted from transmitting/receiving section 301 using the IP address set in base station apparatus 300, and outputs the decapsulated IP packet to paging processing section 303 and MIP management section 304. Particularly, upon receiving a packet including a paging request message transmitted from access gateway apparatus 200, IP layer processing section 302 outputs this paging request message to paging processing section 303.

Furthermore, upon receiving an IP packet directed to the radio terminal apparatus after a paging reply, IP layer processing section 302 outputs report information indicating the reception of a first IP packet directed to UE 400, to position registration judgment section 306. Upon receiving second and subsequent IP packets directed to UE 400, IP layer processing section 302 does not send report information to paging processing section 303.

Furthermore, IP layer processing section 302 encapsulates a packet using the IP address set in base station apparatus 300, and outputs the encapsulated packet to transmitting/receiving section 301. Particularly, IP layer processing section 302 packetizes a paging reply message in response to a paging request generated in paging processing section 303, and outputs this packet to transmitting/receiving section 301.

Paging processing section 303 performs the paging processing of base station apparatus 300 based on a paging request message from access gateway apparatus 200 inputted from IP layer processing section 302, and generates a paging reply message (i.e. paging reply). That is, paging processing section 303 tentatively stores, in page units, information whereby the paging of the destination radio terminal apparatus can be checked, from inside the paging request message, and, after a link is established with the destination radio terminal apparatus, outputs a paging reply message indicating that base station apparatus 300 accommodates the destination radio terminal apparatus, to IP layer processing section 302.

Furthermore, when a paging request message from access gateway apparatus 200 to radio terminal apparatus is inputted from IP layer processing section 302, paging processing section 303 performs position registration processing for establishing an IP tunnel. To be more specific, upon receiving a paging request message from IP layer processing section 302, position registration judgment section 306 of paging processing section 303 judges whether or not it is possible to establish a radio link with the radio terminal apparatus of the paging target of the paging request, and outputs the judgment result to position registration section 307.

When the judgment result inputted from position registration judgment section 306 indicates that a radio link has been established, position registration section 307 outputs the IP address set in access gateway apparatus 200 of the source of the paging request message, to database 305. To be more specific, position registration section 307 checks whether or not the IP address set in the destination radio terminal apparatus of the paging target of the paging request tentatively stored during the paging processing matches the IP address of the radio terminal apparatus with which a radio link has been established. When the IP addresses match, position registration section 307 registers the IP address set in access gateway apparatus 200 of the sender of the paging request message as the CoA with database 305. In this way, the CoA of the routing table is changed to the IP address set in access gateway apparatus 200.

Furthermore, upon receiving report information indicating the reception of the first packet directed to radio terminal apparatus 400 from IP layer processing section 302, position registration section 307 checks that the position registration processing has been completed in access gateway apparatus 200 and an IP tunnel has been established, performs position registration completion processing and updates database 305. Examples of position registration completion processing include processing of setting a flag, which means establishment of an IP tunnel.

MIP MA management section 304 has a proxy MIP mobile agent function and performs MIP-related processings. For example, MIP MA management section 304 performs position registration when the radio terminal apparatus moves.

Database 305 is a mobile IP ("MIP")-related database (i.e. MIP database) and stores information such as IP addresses inputted especially when position registration processing is carried out in position registration section 307.

Figure 9:
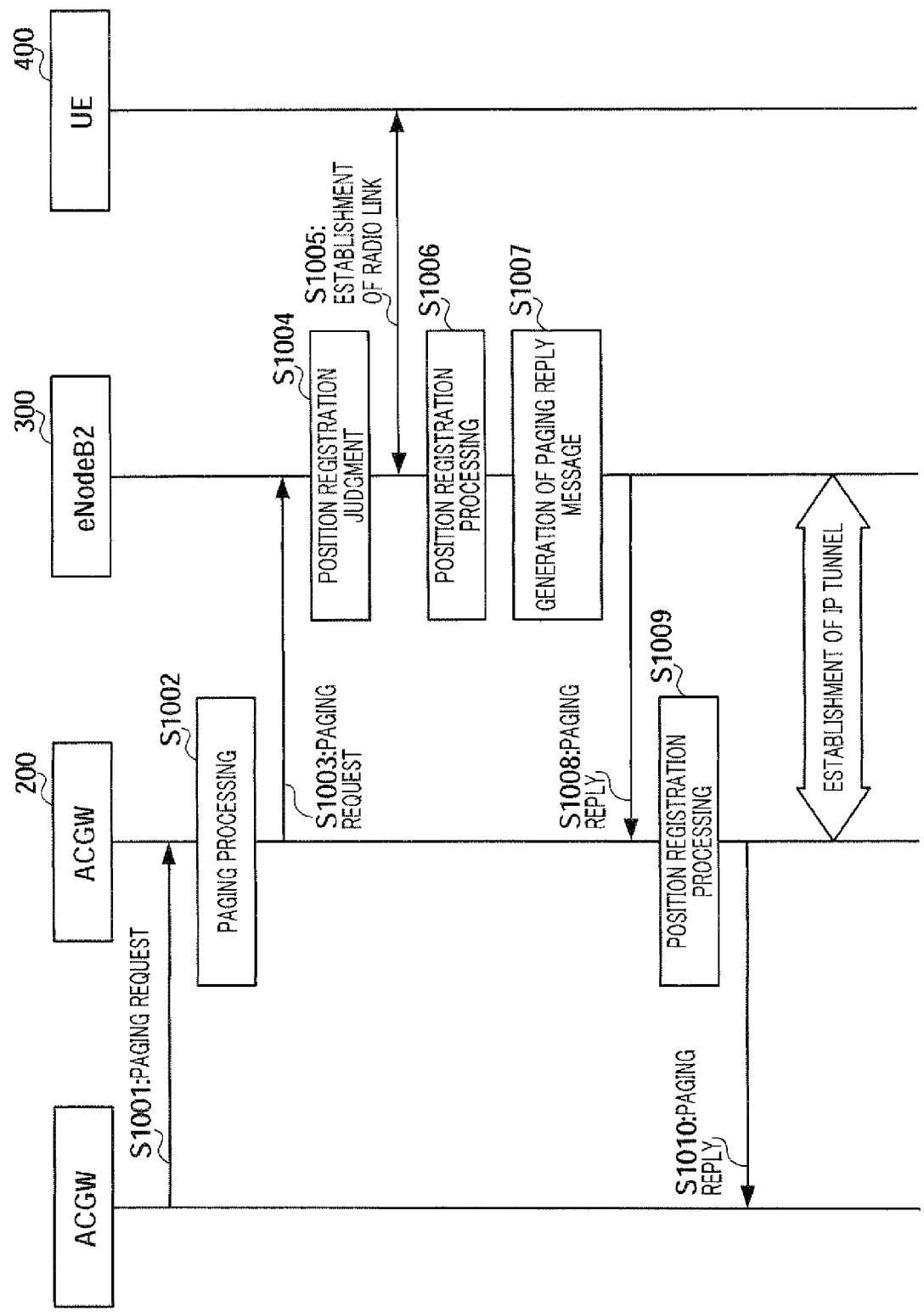
FIG. 9 is a sequence diagram illustrating operations of a communication control system according to the embodiment of the present invention.

Next, the operations of access gateway apparatus 200 and base station apparatus 300 when a paging request for a destination of radio terminal apparatus in the tracking area of access gateway apparatus 200 is received from another access gateway apparatus and so on, will be explained using the sequence diagram of FIG. 9.

First, in step S1001, transmitting/receiving section 201 of access gateway apparatus 200 receives a packet including a paging request message from another access gateway apparatus, and IP layer processing section 302 decapsulates the packet using the IP address set in access gateway apparatus 200, and outputs the paging request message to paging processing section 203.

In step S1002, paging processing section 203 performs paging processing based on the paging request message. Here, the IP address of the destination radio terminal apparatus included in the paging request message, is tentatively stored.

Next, in step S1003, transmitting/receiving section 201 transmits the paging request message to base station apparatus (i.e. eNode B) 300, and transmitting/receiving section 301 of base station apparatus 300 receives this paging request message. IP layer processing section 302 decapsulates the packet using the IP address set in base station apparatus 300, and outputs the paging request message to paging processing section 303.

Next, in step S1004, paging processing section 303 performs paging processing of base station apparatus 300, and performs position registration processing for establishing a path. To be more specific, position registration judgment section 306 judges whether or not it is possible to establish a radio link with radio terminal apparatus 400 of the paging target addressed by the paging request message. Since a radio link can be established with radio terminal apparatus 400 in this case (step S1005), position registration judgment section 306 judges that the position registration of the paging request source is possible, and outputs the judgment result to position registration section 307.

Next, in step S1006, according to the judgment result in position registration judgment section 306, position registration section 307 checks whether or not the IP address set in the destination radio terminal apparatus of the paging request tentatively stored during the paging processing matches the IP address of the radio terminal apparatus with which a radio link is established. When the IP addresses match, position registration section 307 registers the IP address set in access gateway apparatus 200 which of the sender of the paging request message as the CoA, with database 305. By this means, the CoA of the routing table is changed to the IP address set in access gateway apparatus 200.

Next, in step S1007, paging processing section 303 generates a paging reply message.

Next, in step S1008, IP layer processing section 302 packetizes the paging reply message generated in paging processing section 303, and transmitting/receiving section 301 transmits this packet to access gateway apparatus 200.

Transmitting/receiving section 201 of access gateway apparatus 200 receives the packet transmitted from base station apparatus 300, and IP layer processing section 202 decapsulates the packet and outputs the paging reply message to position registration section 206 of paging processing section 203.

Next, in step S1009, position registration section 206 checks, based on the paging reply message, whether or not the IP address of the radio terminal apparatus included in this paging reply message matches the IP address of the destination radio terminal apparatus included in the paging request message tentatively stored during the paging processing. When the IP addresses match, position registration section 206 registers the IP address of the sender of the paging reply message, that is, registers the IP address set in the base station apparatus that accommodates the radio terminal apparatus with the matching IP address, as the CoA, with database 205.

In step S1010, paging processing section 203 generates a paging reply message and transmits the paging reply message to another access gateway apparatus via IP layer processing section 202 and transmitting/receiving section 201. By this means, an IP tunnel is established between access gateway apparatus 200 and base station apparatus 300. Base station apparatus 300 interprets the first received IP packet directed to UE 400 to be a position registration completion report for access gateway apparatus 200. By this means, the amount of traffic required for conventional position registration reply messages is reduced.

In this way, according to the present embodiment, base station apparatus 300 receives a paging request message for a radio terminal apparatus transmitted from access gateway apparatus 200, and judges whether or not it is possible to establish a radio link with the radio terminal apparatus of the paging target addressed by the paging request message. When a radio link is established, base station apparatus 300 registers the IP address set in the sender of the paging request message, generates a paging reply message indicating that the radio terminal apparatus is accommodated, in response to the paging request message, and transmits the paging reply message to access gateway apparatus 200. Access gateway apparatus 200 receives the paging reply message transmitted from base station apparatus 300 and registers the IP address set in the source of the paging request message based on the paging reply message. By this means, it is possible to reduce the amount of traffic involved in position registration processing, reduce the processing load on the CPU and reduce the band used for the channel.

The operation of MIP is not limited to the operation explained in the above-described embodiment, and the present invention is also applicable to, for example, MIPv4, MIPv6, and HMIP. Furthermore, the paging operation and position registration operation are not limited to the operations explained in the above-described embodiment. Furthermore, the present invention is not bound to use MIP and is applicable to any protocols having similar functions to MIP.

INDUSTRIAL APPLICABILITY

The access gateway apparatus, base station apparatus, communication control system and communication control method of the present invention provides an advantage of reducing the amount of traffic involved in position registration processing, processing load on the CPU and band used for the channel, and are therefore suitable for use as a communication control system in a next-generation 3GPP system.

The invention claimed is:

1. A base station apparatus comprising:
a receiving section that receives a paging request message addressed to a radio terminal apparatus, the paging request message being transmitted from an access gateway apparatus;
a position registration judgment section that judges whether or not a radio link is possible with the radio terminal apparatus;
a position registration section that registers, when a radio link is established, a first interact protocol address indicating the access gateway apparatus;
a paging reply section that generates, in response to the paging request message, a paging reply message indicating that the radio terminal apparatus is accommodated; and
a transmitting section that transmits the paging reply message to the access gateway apparatus as a position registration request message for requesting registration of a second internet protocol address established in the base station apparatus without transmitting a separate position registration request message.

2. An access gateway apparatus comprising:
a receiving section that receives a paging reply message transmitted from a base station apparatus indicating that the base station apparatus accommodates the radio terminal apparatus; and
a mobile internet protocol registration section that registers an internet protocol address by processing the paging reply message as a position registration request message for requesting the registration of the internet protocol address which is established in the base station apparatus without receiving a separate position registration request message.

3. A communication control system comprising:
a base station apparatus and an access gateway apparatus, the access gateway apparatus communicating with the base station apparatus for controlling communication with a radio terminal apparatus accommodated by the base station apparatus,
the base station apparatus comprising:
a receiving section that receives a paging request message addressed to the radio terminal apparatus, the paging request message being transmitted from the access gateway apparatus;
a position registration judgment section that judges whether or not a radio link is possible with the radio terminal apparatus;
a position registration section that registers, when a radio link is established, a first internet protocol address indicating the access gateway apparatus; and
a transmitting section that transmits a paging reply message to the access gateway apparatus as a position registration request message for requesting registration of a second internet protocol address established in the base station apparatus without transmitting a separate position registration request message, and
the access gateway apparatus comprising:
a receiving section that receives the paging reply message, transmitted from the base station apparatus; and
a position registration section that registers the second internet protocol address by processing the paging reply message as the position registration request message for requesting the registration of the second internet protocol address established in the base station apparatus without receiving a separate position registration request message.

4. A communication control method, for a communication control system comprising a base station apparatus and an access gateway apparatus that accommodates the base station apparatus, the method controlling communication with a radio terminal apparatus accommodated by the base station apparatus and comprising:
in the base station apparatus:
receiving a paging request message transmitted from the access gateway apparatus to the radio terminal apparatus;
judging whether or not a radio link is possible with the radio terminal apparatus;
registering, when a radio link is established, a first internet protocol address indicating the access gateway apparatus;
generating, in response to the paging request message, a paging reply message indicating that the radio terminal apparatus is accommodated; and
transmitting the paging reply message to the access gateway apparatus as a position registration request message for requesting registration of a second internet protocol address established in the base station apparatus without transmitting a separate position registration request message, and
in the access gateway apparatus:
receiving the paging reply message transmitted from the base station apparatus; and
registering the second internet protocol address by processing the paging reply message as the position registration request message for requesting the registration of the second internet protocol address established in the base station apparatus without receiving a separate position registration request message.

* * * * *